United States Patent
Takada et al.

(10) Patent No.: US 10,233,989 B2
(45) Date of Patent: Mar. 19, 2019

(54) FRICTION MATERIAL

(71) Applicant: AKEBONO BRAKE INDUSTRY CO., LTD., Tokyo (JP)

(72) Inventors: Takuya Takada, Tokyo (JP); Motoyuki Miyaji, Tokyo (JP); Toru Kawata, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/447,309

(22) Filed: Mar. 2, 2017

(65) Prior Publication Data

US 2017/0254378 A1 Sep. 7, 2017

(30) Foreign Application Priority Data

Mar. 7, 2016 (JP) .................. 2016-043837

(51) Int. Cl.
*F16D 69/02* (2006.01)
*C08K 7/02* (2006.01)
*C08L 61/06* (2006.01)

(52) U.S. Cl.
CPC ............ *F16D 69/026* (2013.01); *C08K 7/02* (2013.01); *C08L 61/06* (2013.01); *C08L 2205/16* (2013.01); *F16D 2200/0065* (2013.01); *F16D 2200/0069* (2013.01)

(58) Field of Classification Search
CPC .......... F16D 69/026; F16D 2200/0069; F16D 2200/0065; C08K 7/02; C08L 61/06; C08L 2205/16
See application file for complete search history.

(56) References Cited

U.S. PATENT DOCUMENTS

| | | | |
|---|---|---|---|
| 5,177,137 A * | 1/1993 | Kawashima | C08K 3/22 524/413 |
| 7,338,987 B2 | 3/2008 | Ono et al. | |
| 8,418,818 B2 | 4/2013 | Ono et al. | |
| 2004/0247847 A1 | 12/2004 | Nagayoshi et al. | |
| 2004/0262104 A1 | 12/2004 | Ono et al. | |
| 2006/0162259 A1 | 7/2006 | Ono et al. | |
| 2011/0152066 A1 | 6/2011 | Wang et al. | |

FOREIGN PATENT DOCUMENTS

| | | |
|---|---|---|
| EP | A1-1454974 | 9/2004 |
| EP | A1-1609837 | 12/2005 |
| JP | 2004-346179 A | 12/2004 |
| JP | 2007-277418 A | 10/2007 |
| JP | 2011-17016 A | 1/2011 |
| JP | 2013-163714 A | 8/2013 |

OTHER PUBLICATIONS

Extended European Search Report dated Jul. 28, 2017 in corresponding European patent application 17159293.4 (6 pages).

\* cited by examiner

*Primary Examiner* — Alexander C Kollias
(74) *Attorney, Agent, or Firm* — Drinker Biddle & Reath LLP

(57) ABSTRACT

A friction material includes a fiber base material, a friction modifying material and a binder. The friction modifying material includes alumina particles including, as a main component, θ-alumina particles. The θ-alumina particles are contained in an amount of 1 mass % or more in the friction material.

2 Claims, No Drawings

FRICTION MATERIAL

CROSS-REFERENCE TO RELATED APPLICATIONS

This application claims priority from Japanese Patent Application No. 2016-043837 filed on Mar. 7, 2016, the entire subject matter of which is incorporated herein by reference.

BACKGROUND OF THE INVENTION

Technical Field

The present invention relate to a friction material, and more specifically a friction material to be used for brake pads, brake linings, clutch facings, etc. of industrial machines, railway vehicles, cargo vehicles, passenger automobiles, etc.

Background Art

Friction materials are used for brakes such as disc brakes and drum brakes, clutches or the like, and play a role in braking by friction with counterpart materials to the disc brakes, etc. Properties required for the friction materials include, for example, a high friction coefficient, a small decrease in friction coefficient at high load, high temperature or the like (fading properties), low possibility of generation of noise or squeal in braking, low counterpart material attack, etc.

The friction material is formed of raw materials such as a fiber base material for exerting a reinforcing function, a friction modifying material for imparting a friction function and modifying its friction performance and a binder for integrating these components. Examples of materials for modifying friction properties of the friction material include, for example, inorganic friction modifying materials such as alumina, silica, magnesia and zirconia, organic friction modifying materials such as synthetic rubbers and cashew resins, solid lubricants such as graphite and molybdenum disulfide, etc.

Alumina has been widely used for improving braking properties of the friction material. For example, Patent Document 1 proposes a friction material containing, based on the total amount of a friction material composition, 0.2 wt. % to 5.0 wt. % of calcined alumina particles containing 70 wt. % to 95 wt. % of α-alumina and the balance being transition alumina with inevitable impurities. Further, Patent Document 2 describes that in a friction material formed by hot-pressing a friction material composition containing active alumina as an inorganic friction modifying agent and a fluorine-based polymer as an organic friction modifying agent, γ-alumina is used as the active alumina. In addition, Patent Document 3 proposes a friction material composition containing α-alumina and γ-alumina in an weight ratio of α-alumina:γ-alumina=1:20 to 1:5 as a part of an inorganic friction modifying material and using a silicone-containing phenol resin as the whole or a part of a binder, and a friction material formed by hot-pressing the friction material composition.

On the other hand, the friction coefficient changes due to changes in the humidity environment, sometimes resulting in unstable friction properties. It has therefore been desired to stabilize the friction properties under the changes in humidity environment. For example, Patent Document 4 proposes, as a friction material in which the friction coefficient does not largely change due to humidity, a friction material including a non-whisker-shaped titanate compound and bio-soluble inorganic fiber.

Patent Document 1: JP-A-2013-163714
Patent Document 2: JP-A-2011-17016
Patent Document 3: JP-A-2004-346179
Patent Document 4: JP-A-2007-277418

SUMMARY OF THE INVENTION

As in the conventional art described above, it is possible to improve braking properties by using a hard material such as α-alumina in a friction material. However, it sometimes becomes insufficient to suppress counterpart material attack. In the conventional art, it has not been tried to stabilize changes in the friction coefficient due to changes in the humidity environment while considering the counterpart material attack. Accordingly, a friction material satisfying both properties has been desired. An object in an aspect of the present invention is therefore to provide a friction material which enhances stability of the friction coefficient to changes in the humidity environment and can suppress the counterpart material attack.

The present inventors have made intensive studies. As a result, it has been found that changes in the friction properties due to changes in the humidity environment can be stabilized and that the counterpart material attack can also be suppressed, by allowing alumina particles including, as a main component, θ-alumina particles to be contained in a friction material, thus leading to completion of the present invention.

That is, the present invention provides the following friction material.

(1) A friction material comprising a fiber base material, a friction modifying material and a binder, wherein
the friction modifying material comprises alumina particles comprising, as a main component, θ-alumina particles, and
the θ-alumina particles are contained in an amount of 1 mass % or more in the friction material.

(2) The friction material according to the above (1), wherein the θ-alumina particles have a specific surface area of 40 $m^2/g$ or more and 150 $m^2/g$ or less.

In an aspect of the present invention, changes in friction properties due to changes in humidity environment can be suppressed, so that even when the use environment changes, such as use in summer or use in winter, friction properties are less likely to be affected by the environment. Therefore, excellent effects of being able to maintain stable friction properties and also suppressing the counterpart material attack are achieved.

DETAILED DESCRIPTION OF THE INVENTION

A friction material in an aspect of the present invention is described below in detail.

In an aspect of the present invention, the friction material contains a fiber base material, a friction modifying material and a binder, the above-described friction modifying material alumina particles contains, as a main component, θ-alumina particles, and the θ-alumina particles are contained in an amount of 1 mass % or more in the friction material.

The fiber base material is used for reinforcement when the friction material is formed, and as the fiber base material, examples thereof include an organic fiber, an inorganic fiber, a metal fiber and the like. Examples of the organic fibers include, for example, aromatic polyamide (aramid) fibers, flame-resistant acrylic fibers, cellulose fibers, etc., and examples of the inorganic fibers include, for example, bio-soluble fibers, glass fibers, carbon fibers, etc. In addition, examples of the metal fibers include, for example, steel fibers, aluminum fibers, zinc fibers, tin or tin alloy fibers, stainless steel fibers, copper or copper alloy fibers, etc. The fiber base materials may be used individually or in combination of two or more thereof.

Among these fiber base materials, the aramid fiber is preferably used individually or in combination with the other fiber base material(s). As the other base material(s), the bio-soluble fiber may be suitably used because of its little effect on human body. Examples of such bio-soluble fibers include bio-soluble ceramic fibers such as $SiO_2$—$CaO$—$MgO$-based fibers, $SiO_2$—$CaO$—$MgO$—$Al_2O_3$-based fibers and $SiO_2$—$MgO$—$SrO$-based fibers, bio-soluble rock wools, etc.

In order to ensure the sufficient mechanical strength, the content of the fiber base material is preferably 1 mass % or more and 15 mass % or less, and more preferably 2 mass % or more and 10 mass % or less, based on the whole friction material.

The friction modifying material is used for the purpose of imparting desired friction properties such as wear resistance, heat resistance and fade resistance.

In order to stabilize the friction properties in response to changes in the humidity environment, more specifically, changes in the absolute humidity, the friction material in an aspect of the present invention contains, as the friction modifying material, the alumina particles containing, as a main component, θ-alumina particles.

The term "containing/including, as a main component, θ-alumina particles" means that the θ-alumina particles are contained in a ratio of 50 mass % or more, preferably 70 mass % or more.

In addition, the absolute humidity is a value expressed in grams, which shows the amount of water vapor per 1 m$^3$ of air.

The θ-alumina particles can be obtained by using an aluminum hydroxide hydrate such as boehmite or pseudo-boehmite as a starting raw material and firing it at about 800° C. to 1,000° C. When the starting raw material is fired, a dehydration reaction occurs, and the θ-alumina particles have a surface structure in which many pores are generated in a crystal structure thereof by dehydration. It is presumed that when the θ-alumina particles are allowed to be contained in the friction material, moisture in the atmosphere does not have an influence on the friction properties by humidity-controlling properties of the θ-alumina particles even in the case where the absolute humidity changes, thereby being able to maintain the stable friction properties. In addition, it is presumed that reduction in effectiveness caused by fading is suppressed, because tar (liquid decomposed matter) or gas generated by pyrolysis of organic components during high-temperature braking is adsorbed by the above-described pores. However, the present invention should not be construed as being limited to such a speculative theory.

The specific surface area of the θ-alumina particles is preferably 40 m$^2$/g or more and 150 m$^2$/g or less. When the specific surface area of the θ-alumina particles is less than 40 m$^2$/g, the humidity-controlling properties are not sufficiently obtained. Therefore, the desired effects of the present invention are not obtained, and the adsorption amount of tar or gas is also decreased. Accordingly, the fading properties are sometimes deteriorated. Then, the hardness of the θ-alumina particles is increased, and the counterpart material attack may be increased. When the specific surface area is 40 m$^2$/g or more, moderate grinding properties and humidity-controlling properties are obtained, and therefore, changes in the friction coefficient to changes in the absolute humidity can be suppressed. In addition, the tar or gas generated during braking is also adsorbed, and therefore, the fade resistance can be obtained. The specific surface area in an aspect of the present invention is a value measured by a BET method by nitrogen gas adsorption.

Further, when the specific surface area is excessively increased, moisture in the high-humidity environment is excessively adsorbed, and therefore, the friction properties sometimes become unstable. In addition, since the amount of adsorption of the binder described later by the θ-alumina particles is increased, the friction modifying material and the fiber base material are not sufficiently integrated, thermoforming properties are deteriorated, and cracks, etc. may be developed in the friction material. The specific surface area is therefore preferably 150 m$^2$/g or less.

The specific surface area is more preferably 60 m$^2$/g or more, and preferably 120 m$^2$/g or less, more preferably 100 m$^2$/g or less.

The average particle size of the θ-alumina particles is preferably 1 μm or more and 300 μm or less. When the average particle size of the θ-alumina particles is smaller than 1 μm, effectiveness during braking is not sometimes sufficiently obtained. On the other hand, when the average particle size exceeds 300 μm, the counterpart material attack may be increased, and the wear resistance of the friction material is sometimes deteriorated. The average particle size is more preferably 20 μm or more, and preferably 250 μm or less, more preferably 100 μm or less.

The average particle size of the θ-alumina particles can be determined from a value of $D_{50}$ measured with a laser diffraction particle size distribution measuring device.

The alumina particles may contain any one of other alumina particles such as α-alumina particles, n-alumina particles, γ-alumina particles and δ-alumina particles, as long as the θ-alumina particles are contained as a main component, as described above. In an aspect of the present invention, the θ-alumina particles are contained in an amount of preferably 70 mass % or more, more preferably 80 mass % or more, and still more preferably 90 mass % or more, in the alumina particles. In an aspect of the present invention, the alumina particles are most preferably composed of only the θ-alumina particles (that is, the ratio of the θ-alumina particles is 100%).

In an aspect of the present invention, the θ-alumina particles is allowed to be contained in an amount of 1 mass % or more in the friction material. When the θ-alumina particles is contained in an amount of 1 mass % or more in the friction material, changes in the friction coefficient due to changes in the humidity environment can be suppressed. When the content of the θ-alumina particles is less than 1 mass %, not only the effects of the present invention cannot be obtained, but also the fade resistance of the friction material tends not to be sufficiently obtained. The content of the θ-alumina particles in the friction material is preferably 2 mass % or more, more preferably 4 mass % or more, and still more preferably 6 mass % or more. In addition, the upper limit of the content of the θ-alumina particles may be appropriately determined depending on the other filling material(s) or the friction properties required, and is not particularly limited. However, an excessively high content thereof sometimes causes formability of the friction material to be deteriorated or the counterpart material attack to be increased. For example, the content thereof is preferably less than 15 mass %, more preferably 14 mass % or less, still more preferably 12 mass % or less, and particularly preferably 8 mass % or less.

In the friction material in an aspect of the present invention, the other friction modifying material(s) which may be usually employed can be used, without departing from the spirit of the present invention.

Examples of the other friction modifying materials include, for example, inorganic fillers such as barium sulfate, calcium carbonate, calcium hydroxide, vermiculite, mica, potassium titanate, lithium potassium titanate and magnesium potassium titanate, abrasives such as silica, magnesia, zirconia, zirconium silicate, chromium oxide and triiron tetroxide ($Fe_3O_4$), metal powders such as aluminum, zinc and tin, organic fillers such as various rubber powders (rubber dust, tire powders, etc.), cashew dust and melamine dust, solid lubricants such as graphite, molybdenum disulfide, tin sulfide and polytetrafluoroethylene (PTFE), etc. These may be used individually or in combination of two or more thereof.

The content of the friction modifying material may be appropriately adjusted depending on the desired friction properties, and the total amount of the friction modifying material containing the alumina particles is preferably 60 mass % or more and 90 mass % or less, and more preferably 65 mass % or more and 85 mass % or less, based on the whole friction material.

The binder is used for integrating the fiber base material and the friction modifying material, which are contained in the friction material. Examples of the binders include, for example, thermosetting resins such as straight phenol resins, various phenol resins modified with elastomers, etc, melamine resins, epoxy resins and polyimide resins. Examples of the elastomer-modified phenol resins include acrylic rubber-modified phenol resins, silicone rubber-modified phenol resins, NBR rubber-modified phenol resin, etc. These binders may be used individually or in combination of two or more thereof.

In order to ensure the sufficient mechanical strength and wear resistance, the content of the binder is preferably 5 mass % or more and 13 mass % or less, and more preferably 7 mass % or more and 11 mass % or less, based on the whole friction material.

In addition to the fiber base material, the friction modifying material and the binder, the other material(s) may be blended in the friction material, as needed.

The friction material in an aspect of the present invention can be produced by a conventional production process. For example, the friction material can be produced through steps of preforming, thermoforming, heating, grinding, etc. A general process in the production of a brake pad for a disc brake is shown below:

(a) a step of forming a steel plate (pressure plate) into a predetermined shape with a sheet metal press, (b) a step of subjecting the above-described pressure plate to degreasing treatment, chemical conversion treatment and primer treatment, and applying an adhesive thereon, (c) a step of blending the fiber base material, the friction modifying material and a powdery raw material such as the binder, preparing a friction material composition sufficiently homogenized by mixing, and forming the composition at room temperature and a predetermined pressure to produce a preformed body, (d) a thermoforming step of integrally firmly fixing the above-described preformed body to the pressure plate on which the adhesive has been applied, at a predetermined temperature and pressure (forming temperature: 130° C. to 180° C., forming pressure: 30 MPa to 80 MPa, forming time: 2 min to 10 min), and (e) a step of performing after-cure (at 150° C. to 300° C. for 1 hour to 5 hours), and finally performing finishing treatment such as grinding, scorching and painting.

The brake pad for a disc brake including the friction material of the present invention can be produced by such steps.

The friction material in an aspect of the present invention can also be suitably used as a so-called copper-free non-asbestos friction material having a copper content of 0.5 mass % or less in terms of an element (i.e. copper). In order to ensure the fade resistance, a copper component such as copper or copper alloy fiber or particles is added to the friction material. However, in the case of the friction material containing the copper component, the copper component is discharged as wear debris in the air by braking, and therefore, the influence thereof on the natural environment has been pointed out. Then, efforts have been made to restrict the use of copper, etc. in automobile brake pads, and various copper-free friction materials have been proposed.

In an aspect of the present invention, the θ-alumina particles are used as the main component of the alumina particles, and allowed to be contained in an amount of 1 mass % or more in the friction material. Then, the tar or gas generated during braking is adsorbed in the pores of the θ-alumina particles, as described above, and therefore, even the friction material having a copper content of 0.5 mass % or less can have the fade resistance.

The friction material in an aspect of the present invention is also applicable to a low-steel copper-free material.

The friction material of the present invention can be suitably used as a friction material such as a brake pad or a brake lining of an automobile, etc.

EXAMPLES

The present invention is further described below with reference to Examples and Comparative Examples, but the present invention should not be construed as being limited to the following Examples.

Testing methods of brake pads obtained in Examples of the present invention and Comparative Examples are as follows.

(1) Formability of Friction Material

In the production of a brake pad, formability of a friction material during thermoforming was visually judged based on the following evaluation criteria.

[Evaluation Criteria]

A: No crack was generated.

B: One or more wrinkles were confirmed (no problem as a product).

D: One or more cracks were confirmed (unusable as a product).

(2) Measurement of Friction Coefficient for Each Absolute Humidity Condition

Using a 1/7 scale tester, the resulting brake pad was tested based on the test conditions of Table 1, under environmental conditions of an absolute humidity of 4 $g/m^3$ (winter conditions: 10° C. in atmospheric temperature, 40% in humidity) and environmental conditions of an absolute humidity of 20 $g/m^3$ (summer conditions: 30° C. in atmospheric temperature, 67% in humidity).

TABLE 1

| No. | Item | Disc Rotor Braking Initial Temperature (° C.) | Initial Speed (km/h) | Final Speed (km/h) | Control Deceleration Rate (m/s$^2$) | Control Hydraulic Pressure (MPa) | Number of Braking Times (times) |
|---|---|---|---|---|---|---|---|
| 1 | Burnishing Frictional Contact | 100 | 50 | 3 | 2.94 | — | 100 |
| 2 | Braking Condition 1 | 50 | 20 | 3 | — | 0.5, 1.0, 1.5, 2.0 | 1 for each hydraulic pressure |
| 3 | Braking Condition 2 | 80 | | | | | |
| 4 | Braking Condition 3 | 100 | | | | | |
| 5 | Braking Condition 4 | 150 | | | | | |
| 6 | Braking Condition 5 | 200 | | | | | |
| 7 | Braking Condition 6 | 150 | | | | | |
| 8 | Braking Condition 7 | 100 | | | | | |
| 9 | Braking Condition 8 | 80 | | | | | |
| 10 | Braking Condition 9 | 50 | | | | | |

First, in order to stabilize the effectiveness during braking, braking was performed at a braking initial temperature of 100° C. and a deceleration rate of 2.94 m/s$^2$ from an initial speed of 50 km/h to a final speed of 3 km/h, under each absolute humidity condition. This was repeated 100 times to perform burnishing frictional contact of a friction surface.

Then, based on the braking condition 1 of Table 1, braking was performed at a braking initial temperature of 50° C. and a hydraulic pressure of each of 0.5 MPa, 1.0 MPa, 1.5 MPa and 2.0 MPa from an initial speed of 20 km/h to a final speed of 3 km/h. Thereafter, braking was similarly performed based on each of the braking conditions 2 to 9, and after completion of the braking condition 9, the friction coefficient was measured.

A cycle of the braking conditions 1 to 9 was repeated 4 times to obtain the friction coefficient of 5 cycles in total, and the average friction coefficient thereof was determined.

The difference between the average friction coefficient at an absolute humidity of 4 g/m$^3$ and the average friction coefficient at an absolute humidity of 20 g/m$^3$ was determined from the following formula. Evaluation criteria thereof are as follows.

Difference between the average friction coefficients (%)={(average friction coefficient at an absolute humidity of 4 g/m$^3$–average friction coefficient at an absolute humidity of 20 g/m$^3$)/(average friction coefficient at an absolute humidity of 4 g/m$^3$)}×100   [Numerical Formula 1]

[Evaluation Criteria]
A: The difference between the average friction coefficients was less than ±5%.
B: The difference between the average friction coefficients was ±5% or more and less than ±10%.
C: The difference between the average friction coefficients was ±10% or more and less than ±15%
D: The difference between the average friction coefficients was ±15% or more.

(3) Low Pressure Wear Rotor Kindness Test (Counterpart Material Attack)

The resulting brake pad was pressed to a disc rotor (material: FC200) at a surface pressure of 0.06 MPa, and braking was applied thereto at room temperature (about 20° C.) and a speed of 60 km/h. After 40 hours, the rotor wear amount (μm) was measured. Evaluation criteria of the low pressure wear rotor kindness test are as follows:

[Evaluation Criteria]
A: The rotor wear amount was less than 10 μm.
B: The rotor wear amount was 10 μm or more and 15 μm or less.
C: The rotor wear amount was more than 15 μm and 20 μm or less.
D: The rotor wear amount was more than 20 μm.

(4) Friction Test

Using a ½ scale tester, a friction test was performed for the resulting brake pad to measure the friction coefficients of the second effectiveness and the first fade.

For the second effectiveness, the average friction coefficient in the second effectiveness at an initial speed of 130 km/h was measured in conformity with JASO C 406:2000. For the first fade, the minimum friction coefficient in the first fade was measured in conformity with JASO C 406:2000. Evaluation criteria of the second effectiveness and the first fade are as follows:

[Evaluation Criteria of Second Effectiveness]
A: The average friction coefficient was 0.45 or more and less than 0.50.
B: The average friction coefficient was 0.40 or more and less than 0.45.
C: The average friction coefficient was 0.35 or more and less than 0.40.
D: The average friction coefficient was less than 0.35.

[Evaluation Criteria of First Fade]
A: The minimum friction coefficient was 0.30 or more.
B: The minimum friction coefficient was 0.25 or more and less than 0.30.
C: The minimum friction coefficient was 0.20 or more and less than 0.25.
D: The minimum friction coefficient was less than 0.20.

Test Example 1

Examples 1 to 3 and Comparative Examples 1 to 3

The blending materials shown in Table 2 were correctively introduced into a mixing stirrer, followed by mixing at room temperature for 2 minutes to 10 minutes, thereby obtaining a friction material composition. Thereafter, the resulting friction material composition was subjected to the following steps of preforming (1), thermoforming (2) and heating and baking (3), thereby preparing a brake pad including a friction material.

(1) Preforming

The friction material composition was introduced into a mold of a preforming press and formed at room temperature and 20 MPa for 10 seconds, thereby preparing a preformed product.

(2) Thermoforming

This preformed product was introduced into a thermoforming mold and overlaid with a metal plate (pressure plate: P/P) previously coated with an adhesive, followed by performing hot-compression forming at 150° C. and 40 MPa for 5 minutes.

(3) Heating and Baking

The hot-compression-formed body was heat-treated at 150° C. to 300° C. for 1 hour to 4 hours, and thereafter ground. Then, the surface of this hot-compression-formed body was subjected to scorching treatment, and painting was performed for finishing, thereby obtaining the brake pad including the friction material.

For the above-described prepared brake pads of Examples 1 to 3 and Comparative Examples 1 to 3, the formability during thermoforming was evaluated, and further, the measurement of the friction coefficient for each absolute humidity condition and the low pressure wear rotor kindness test were performed. The results obtained are shown in Table 2.

TABLE 2

| | | | | Example | | | Comparative Example | | |
|---|---|---|---|---|---|---|---|---|---|
| | | (mass %) | | 1 | 2 | 3 | 1 | 2 | 3 |
| Blending composition | Binder | Straight phenol resin | | 8 | 8 | 8 | 8 | 8 | 8 |
| | Friction modifying material | Cashew dust | | 4 | 4 | 4 | 4 | 4 | 4 |
| | | Tire powder | | 3 | 3 | 3 | 3 | 3 | 3 |
| | | Graphite | | 7 | 7 | 7 | 7 | 7 | 7 |
| | | Tin sulfide | | 2 | 2 | 2 | 2 | 2 | 2 |
| | | Barium sulfate | | 25 | 20 | 14 | 25.5 | 20 | 20 |
| | | Calcium hydroxide | | 3 | 3 | 3 | 3 | 3 | 3 |
| | | Mica | | 3 | 3 | 3 | 3 | 3 | 3 |
| | | Potassium titanate | | 15 | 15 | 15 | 15 | 15 | 15 |
| | | Triiron tetroxide | | 12 | 12 | 12 | 12 | 12 | 12 |
| | | Zirconium silicate | | 4 | 4 | 4 | 4 | 4 | 4 |
| | | θ-Alumina, average particle size: 20 μm, specific surface area: 100 m²/g | | 1 | 6 | 12 | 0.5 | 0 | 0 |
| | | α-Alumina, average particle size: 7 μm, specific surface area: 0.7 m²/g | | 0 | 0 | 0 | 0 | 6 | 0 |
| | | γ-Alumina, average particle size: 20 μm, specific surface area: 200 m²/g | | 0 | 0 | 0 | 0 | 0 | 6 |
| | | Zinc powder | | 3 | 3 | 3 | 3 | 3 | 3 |
| | Fiber base material | Aramid fiber | | 4 | 4 | 4 | 4 | 4 | 4 |
| | | Bio-soluble fiber | | 6 | 6 | 6 | 6 | 6 | 6 |
| Total | | | | 100 | 100 | 100 | 100 | 100 | 100 |
| Results | | Difference between the average friction coefficients under environmental conditions of absolute humidities of 4 g/m³ and 20 g/m³ [%] | | 6 | 1 | −1 | 15 | 16 | 15 |
| | | Low pressure wear rotor kindness test [μm], surface pressure: 0.06 MPa | | 7 | 8 | 12 | 6 | 24 | 8 |
| Evaluation | | Difference between the average friction coefficients under environmental conditions of absolute humidities of 4 g/m³ and 20 g/m³ [%] | | B | A | A | D | D | D |
| | | Low pressure wear rotor kindness test [μm], surface pressure: 0.06 MPa | | A | A | B | A | D | A |
| | | Crack resistance during thermoforming | | A | A | B | A | A | B |

From the results of Table 2, in Comparative Example 1 in which the content of the θ-alumina particles was less than 1 mass % and Comparative Examples 2 and 3 in which alumina other than θ-alumina was used, the difference between the friction coefficients for the respective absolute humidity conditions was largely increased, and it was impossible to be compatible with the counterpart material attack. In contrast, in Examples 1 to 3 in which the θ-alumina particles was contained in an amount of 1 mass % or more in the friction material, it was found that the difference between the friction coefficients for the respective absolute humidity conditions was ±6 or less, and that the counterpart material attack could also be sufficiently suppressed.

Test Example 2

Examples 2 and 4 to 11

In the blending compositions shown in Table 3, brake pads each including the friction material were prepared in the same manner as in Test Example 1.

For the resulting brake pads of Examples 2 and 4 to 11, the formability during thermoforming was evaluated, and further, the measurement of the friction coefficient for each absolute humidity condition, the low pressure wear rotor kindness test and the friction test were performed. The results obtained are shown in Table 3.

TABLE 3

| (mass %) | | | | Example 2 | Example 4 | Example 5 | Example 6 | Example 7 |
|---|---|---|---|---|---|---|---|---|
| Blending composition | Binder | Straight phenol resin | | 8 | 8 | 8 | 8 | 8 |
| | Friction modifying material | Cashew dust | | 4 | 4 | 4 | 4 | 4 |
| | | Tire powder | | 3 | 3 | 3 | 3 | 3 |
| | | Graphite | | 7 | 7 | 7 | 7 | 7 |
| | | Tin sulfide | | 2 | 2 | 2 | 2 | 2 |
| | | Barium sulfate | | 20 | 20 | 20 | 20 | 20 |
| | | Calcium hydroxide | | 3 | 3 | 3 | 3 | 3 |
| | | Mica | | 3 | 3 | 3 | 3 | 3 |
| | | Potassium titanate | | 15 | 15 | 15 | 15 | 15 |
| | | Triiron tetroxide | | 12 | 12 | 12 | 12 | 12 |
| | | Zirconium silicate | | 4 | 4 | 4 | 4 | 4 |
| | | θ-Alumina, average particle size: 20 μm, specific surface area: 100 m²/g | | 6 | 0 | 0 | 0 | 0 |
| | | θ-Alumina, average particle size: 1 μm, specific surface area: 100 m²/g | | 0 | 6 | 0 | 0 | 0 |
| | | θ-Alumina, average particle size: 50 μm, specific surface area: 100 m²/g | | 0 | 0 | 6 | 0 | 0 |
| | | θ-Alumina, average particle size: 100 μm, specific surface area: 100 m²/g | | 0 | 0 | 0 | 6 | 0 |
| | | θ-Alumina, average particle size: 250 μm, specific surface area: 100 m²/g | | 0 | 0 | 0 | 0 | 6 |
| | | θ-Alumina, average particle size: 300 μm, specific surface area: 100 m²/g | | 0 | 0 | 0 | 0 | 0 |
| | | θ-Alumina, average particle size: 20 μm, specific surface area: 40 m²/g | | 0 | 0 | 0 | 0 | 0 |
| | | θ-Alumina, average particle size: 20 μm, specific surface area: 60 m²/g | | 0 | 0 | 0 | 0 | 0 |
| | | θ-Alumina, average particle size: 20 μm, specific surface area: 150 m²/g | | 0 | 0 | 0 | 0 | 0 |
| | | Zinc powder | | 3 | 3 | 3 | 3 | 3 |
| | Fiber base material | Aramid fiber | | 4 | 4 | 4 | 4 | 4 |
| | | Bio-soluble fiber | | 6 | 6 | 6 | 6 | 6 |
| Total | | | | 100 | 100 | 100 | 100 | 100 |
| Results | JASO-C406 | Second effectiveness, 130 km/h, average friction coefficient [—] | | 0.45 | 0.43 | 0.45 | 0.45 | 0.45 |
| | | First fade, minimum friction coefficient [—] | | 0.30 | 0.27 | 0.30 | 0.31 | 0.32 |
| | | Difference between the average friction coefficients under environmental conditions of absolute humidities of 4 g/m³ and 20 g/m³ [%] | | 1 | 3 | 2 | 3 | 8 |
| | | Low pressure wear rotor kindness test [μm], surface pressure: 0.06 MPa | | 8 | 7 | 11 | 15 | 18 |
| Evaluation | JASO-C406 | Second effectiveness, 130 km/h, average friction coefficient | | A | B | A | A | A |
| | | First fade, minimum friction coefficient | | A | B | A | A | A |
| | | Difference between the average friction coefficients under environmental conditions of absolute humidities of 4 g/m³ and 20 g/m³ [%] | | A | A | A | A | B |
| | | Low pressure wear rotor kindness test [μm], surface pressure: 0.06 MPa | | A | A | B | B | C |
| | | Crack resistance during thermoforming | | A | B | A | A | A |

| (mass %) | | | | Example 8 | Example 9 | Example 10 | Example 11 |
|---|---|---|---|---|---|---|---|
| Blending composition | Binder | Straight phenol resin | | 8 | 8 | 8 | 8 |
| | Friction modifying material | Cashew dust | | 4 | 4 | 4 | 4 |
| | | Tire powder | | 3 | 3 | 3 | 3 |
| | | Graphite | | 7 | 7 | 7 | 7 |
| | | Tin sulfide | | 2 | 2 | 2 | 2 |
| | | Barium sulfate | | 20 | 20 | 20 | 20 |
| | | Calcium hydroxide | | 3 | 3 | 3 | 3 |
| | | Mica | | 3 | 3 | 3 | 3 |
| | | Potassium titanate | | 15 | 15 | 15 | 15 |
| | | Triiron tetroxide | | 12 | 12 | 12 | 12 |
| | | Zirconium silicate | | 4 | 4 | 4 | 4 |
| | | θ-Alumina, average particle size: 20 μm, specific surface area: 100 m²/g | | 0 | 0 | 0 | 0 |
| | | θ-Alumina, average particle size: 1 μm, specific surface area: 100 m²/g | | 0 | 0 | 0 | 0 |
| | | θ-Alumina, average particle size: 50 μm, specific surface area: 100 m²/g | | 0 | 0 | 0 | 0 |
| | | θ-Alumina, average particle size: 100 μm, specific surface area: 100 m²/g | | 0 | 0 | 0 | 0 |
| | | θ-Alumina, average particle size: 250 μm, specific surface area: 100 m²/g | | 0 | 0 | 0 | 0 |
| | | θ-Alumina, average particle size: 300 μm, specific surface area: 100 m²/g | | 6 | 0 | 0 | 0 |
| | | θ-Alumina, average particle size: 20 μm, specific surface area: 40 m²/g | | 0 | 6 | 0 | 0 |
| | | θ-Alumina, average particle size: 20 μm, specific surface area: 60 m²/g | | 0 | 0 | 6 | 0 |
| | | θ-Alumina, average particle size: 20 μm, specific surface area: 150 m²/g | | 0 | 0 | 0 | 6 |
| | | Zinc powder | | 3 | 3 | 3 | 3 |
| | Fiber base material | Aramid fiber | | 4 | 4 | 4 | 4 |
| | | Bio-soluble fiber | | 6 | 6 | 6 | 6 |
| Total | | | | 100 | 100 | 100 | 100 |
| Results | JASO-C406 | Second effectiveness, 130 km/h, average friction coefficient [—] | | 0.46 | 0.38 | 0.40 | 0.46 |
| | | First fade, minimum friction coefficient [—] | | 0.32 | 0.20 | 0.22 | 0.31 |
| | | Difference between the average friction coefficients under environmental conditions of absolute humidities of 4 g/m³ and 20 g/m³ [%] | | 10 | 3 | 4 | 10 |
| | | Low pressure wear rotor kindness test [μm], surface pressure: 0.06 MPa | | 20 | 20 | 15 | 8 |

TABLE 3-continued

| Evaluation | JASO-C406 | Second effectiveness, 130 km/h, average friction coefficient | A | C | B | A |
| | | First fade, minimum friction coefficient | A | C | C | A |
| | | Difference between the average friction coefficients under environmental conditions of absolute humidities of 4 g/m³ and 20 g/m³ [%] | C | A | A | C |
| | | Low pressure wear rotor kindness test [μm], surface pressure: 0.06 MPa | C | C | B | A |
| | | Crack resistance during thermoforming | A | A | A | B |

From the results of Table 3, in all of Examples 2 and 4 to 11, it was found that the difference between the friction coefficients for the respective absolute humidity conditions was ±10 or less, and that the counterpart material attack was also suppressed low. In addition, it was found that the second effectiveness (high-speed effectiveness) and the fade resistance could also be kept good.

While the invention has been described in detail and with reference to specific embodiments thereof, it will be apparent to one skilled in the art that various changes and modifications can be made therein without departing from the spirit and scope of the invention.

What is claimed is:

1. A friction material, comprising:
a fiber base material,
a friction modifying material and a binder, wherein
the friction modifying material comprises alumina particles comprising, as a main component, θ-alumina particles, and the θ-alumina particles are contained in an amount of 1 mass % or more in the friction material,
wherein the θ-alumina particles have a specific surface area of 60 m²/g or more and 120 m²/g or less, and
wherein a content of the binder is 5 mass % or more and 13 mass % or less.

2. The friction material of claim 1, wherein the θ-alumina particles have a specific surface area of 60 m²/g or more and 100 m²/g or less.

* * * * *